Patented July 17, 1951

2,560,891

UNITED STATES PATENT OFFICE 2,560,891

AMINE SALT PRECIPITANTS FOR ANTIBIOTIC BASES

Peter P. Regna, West New York, N. J., and Isaiah A. Solomons, Garden City, N. Y., assignors to Chas. Pfizer & Co., Inc., Brooklyn, N. Y., a corporation of New Jersey No Drawing. Application December 16, 1948, Serial No. 65,734

11 Claims. (Cl. 260—210)

This invention relates to a method for purifying and isolating salts of alkaline-reacting nitrogen-basic antibiotic substances of high potency. More particularly, it relates to an improved process for purifying and isolating methanol-insoluble salts of streptomycin having high antibiotic assay.

This application is a continuation-in-part of our application Serial No. 674,394, filed June 4, 1946, now Patent No. 2,537,941. The specific applications of our method to the Orange II and naphthol blue-black salts of streptomycin have been disclosed and are claimed in our copending applications Serial Nos. 746,633, filed May 7, 1947, and 748,848, filed May 17, 1947, respectively.

It is known that antibiotic substances prepared from the elaboration products of certain mold organisms are usually obtained associated with undesirable impurities, which must be separated therefrom in order to obtain therapeutically useful products of high antibiotic potency. For example, in the preparation of streptomycin, an elaboration product of Streptomyces griseus, one of the methods of separating active products from the culture medium is by an adsorption on charcoal followed by elution with an acidic solvent, such as water or methanol acidified with hydrochloric acid. Streptomycin can also be recovered from the culture medium by precipitation as a water-insoluble azo sulfonic acid dye salt, for example, the salt of Congo red or helianthic acid. When converted directly by previously known processes to the therapeutically useful mineral acid salts, the crude product thus obtained is a streptomycin salt, e. g., streptomycin trihydrochloride, of relatively low activity or antibiotic potency. The crude streptomycin salts can further be purified by lengthy and complicated procedures involving chromatographic methods. In other methods of purification, the streptomycin is converted to the reineckate, reineckate sulfate, or the helianthate and recrystallized before subsequent conversion to the desired mineral acid salt.

In the preparation of polymyxin, the antibiotic is first precipitated as its water-insoluble helianthic acid salt. This salt is then decomposed by suspension in methanol, acidified by hydrochloric acid. The insoluble helianthic acid is then removed by filtration, and the polymyxin hydrochloride is recovered from the filtrate by the addition of several volumes of acetone. This procedure is not only lengthy and wasteful of solvents, but the precipitation of the polymyxin hydrochloride from methanol by acetone is not sufficiently selective to free the final product from undesirable impurities.

An object of this invention is to provide an improved method of preparing therapeutically active salts of alkaline-reacting nitrogen-basic antibiotic substances of high potency. A further object is to provide an efficient and economical method for separating solid salts of alkaline-reacting nitrogen-basic antibiotic substances from complex mixtures containing these substances. A still further object is to prepare a streptomycin salt of high antibiotic potency from crude concentrates of streptomycin. A still further object is to provide streptomycin salts of improved purity from streptomycin salts isolated by known procedures. Further objects will appear hereafter.

We have now found that excellent yields of high purity, alkaline-reacting, nitrogen-basic antibiotic substances may be obtained by our salt-interchange reaction. In this reaction, a salt of the antibiotic is converted to a dissimilar salt by reaction with an amine salt having the anion of the dissimilar salt in a liquid which is a solvent for both reactants and the final amine salt, but in which the final antibiotic salt is insoluble. We have found that lower aliphatic alcohols of one to four carbon atoms have the necessary preferential solubility for use herein, particularly methanol and its homologues. Hence, in describing this invention we shall refer to "soluble antibiotic salts" and "soluble amine salts." These expressions, of course, refer to salts which are soluble in methanol or the other liquids used for the reaction. In this same manner, the expression "insoluble antibiotic salt" means a salt insoluble in methanol or the reaction medium employed. To determine whether a salt is soluble or insoluble in a given liquid one need only apply the simple test known to every student of chemistry.

In accordance with our invention, a soluble antibiotic salt is reacted with a soluble amine salt in methanol or other lower aliphatic alcohol having from 1 to 4 carbon atoms. By this reaction there is produced a soluble amine salt and an insoluble antibiotic salt. The insoluble salt may be readily recovered by filtration. For example, a methanol solution of streptomycin trihydrochloride and triethylamine sulfate may be reacted to precipitate streptomycin sulfate, which is recovered in excellent yield and purity simply by filtration.

In one method of practicing this invention, crude streptomycin trihydrochloride is obtained from fermentation broth by a carbon adsorption and elution. The streptomycin trihydrochloride so obtained is dissolved in methanol and a solution of triethylamine sulfate in methanol is added at room temperature with stirring. The pH of the solution is usually about 5.5. The streptomycin sulfate, which precipitates immediately, is filtered off, washed with methanol and is dried in vacuo. Streptomycin sulfate of high antibiotic assay is thereby obtained.

Streptomycin salts which have been prepared by other procedures can be treated in accordance with this invention to obtain streptomycin salts of enhanced antibiotic potentcy. For example, streptomycin which has been purified by preparation and recrystallization of its helianthic acid salt is usually recovered by suspending the streptomycin helianthate in methanol, acidifying with hydrochloric acid, filtering the helianthic acid and then precipitating streptomycin trihydrochloride with several volumes of acetone. In accordance with the method of this invention, the streptomycin can be recovered much more expeditiously by suspending the streptomycin helianthate in methanol, acidifying with hydrochloric acid, filtering off the helianthic acid, neutralizing the methanol solution with triethylamine, and then precipitating the streptomycin sulfate by the addition of a methanol solution of triethylamine sulfate.

The recovery of streptomycin from the streptomycin trihydrochloride-calcium chloride double salt can be carried out readily in accordance with this invention as follows:

Streptomycin trihydrochloride-calcium chloride double salt is dissolved in a 50% water-50% methanol mixture and treated with a solution of triethylamine sulfate in methanol. The calcium is completely precipitated as calcium sulfate which is removed by filtration while the streptomycin sulfate remains in solution. Sufficient methanol is then added to the streptomycin sulfate solution to increase the methanol content to 90%. The methanol-insoluble streptomycin sulfate is then precipitated almost quantitatively.

The process of this invention can also be applied to the recovery of streptomycin from the water-insoluble reineckate. The streptomycin reineckate is dissolved in methanol and the solution is mixed with a solution of triethylamine sulfate in methanol. Streptomycin sulfate precipitates immediately and is filtered off leaving the methanol-soluble triethylamine reineckate in the filtrate. Similarly, polymyxin can be recovered from its helianthic acid salt or similar dye salt by suspending the salt in methanol or methanol-acetone mixture, acidifying the suspension with hydrochloric acid, filtering off the liberated insoluble helianthic acid, neutralizing the solution with an amine, and then precipitating the polymyxin salt by adding a solution of an amine salt such as triethylamine sulfate and recovering the insoluble polymyxin sulfate by filtration.

The invention is further illustrated by the following examples:

Example 1

About 5 grams of streptomycin trihydrochloride, isolated from fermentation broth by a carbon adsorption and elution, and having a potency of 150 $\gamma$/mg. is dissolved in 75 ml. of methanol. Five milliliters of a methanolic solution of triethylamine sulfate, prepared by neutralizing a solution of 38 ml. of triethylamine in 70 ml. of methanol with sulfuric acid to pH 5.5, is added. The precipitated streptomycin sulfate is filtered, washed with methanol, and dried in vacuo to yield a product that weighs 2.4 grams and has a potency of 305 $\gamma$/mg.

Example 2

About 10 grams of streptomycin trihydrochloride-calcium chloride double salt, having a potency of 650 $\gamma$/mg. is dissolved in about 60 ml. of 1-1 methanol-water. Sufficient triethylamine sulfate in methanol is added to precipitate the calcium as calcium sulfate. An excess of triethylamine sulfate is not harmful as the streptomycin sulfate is soluble in this mixture of solvents. The calcium sulfate is filtered, and the filtrate is added to about 300 ml. of methanol. Sufficient methanolic triethylamine sulfate is now added to completely precipitate the streptomycin as the methanol insoluble streptomycin sulfate. The streptomycin sulfate is filtered, washed with methanol, and dried in vacuo. It weighs about 8.2 grams and has a potency of 750 $\gamma$/mg.

Example 3

About 5 grams of the helianthic acid salt of streptomycin is suspended in 200 ml. of a solution composed of 90% methanol-10% water containing 1.5 grams of triethylamine sulfate, and the mixture is thoroughly agitated for several hours. The precipitated streptomycin sulfate is filtered over filter-aid from the methanolic solution of triethylamine helianthate, washed with methanol and dried in vacuo. The streptomycin sulfate is recovered by extracting the mixture with water, removing the filter-aid by filtration, then freeze-drying the filtrate. The recovered streptomycin sulfate accounts for 70-90% of the original activity.

Example 4

To an aqueous solution containing 1500 U./ml., made up of polymyxin of ca. 100 U./mg. at pH 3.2 is added 25 grams of Super-Cel and a solution containing 18 grams of Polar Yellow 5G dissolved in 300 ml. of water. After filtering, the precipitate is washed with water and the polymyxin-Polar Yellow salt which remains is dried in vacuo. To the filtrate is added an additional 9 gms. of Polar Yellow and, after again filtering, the resultant filtrate shows less than 50 U./ml. After drying, the combined precipitates are suspended in 500 ml. of a mixture containing 85% acetone-15% methanol. This is followed by the calculated amount of pyridine phosphate in methanol. After mechanically shaking the mixture for one hour, the insoluble polymyxin phosphate is filtered off and washed with a solution containing 85% acetone-15% methanol until a colorless precipitate is obtained. The cake is washed with anhydrous acetone and dried under diminished pressure. The polymyxin phosphate, mixed with Super-Cel, is dissolved in water and filtered. The resultant filtrate is freeze-dried. The dried polymyxin phosphate biologically compared against the working standard has an activity of 4000 U./mg.

Example 5

About 10 grams of mannosidostreptomycin reineckate is dissolved in 1000 ml. of methanol. About 20 grams of Super-Cel is added to the solution, and then with stirring, about 2 gms. of ethylamine phosphate in methanol is added. The precipitated mannosidostreptomycin phosphate is filtered, washed with methanol, and dried in vacuo. The mannosidostreptomycin phosphate is dissolved in water and the filter-aid is removed by a filtration. The filtrate is freeze-dried to yield about 6 grams of product which accounts for about 95% of the original activity.

Example 6

About 14 grams of streptomycin trihydrochloride-calcium chloride double salt assaying 630 γ/mg. is dissolved in 75 ml. of 50% methanol-50% water, and the calcium is precipitated as calcium sulfate by the addition of the calculated amount of triethylamine sulfate in methanol. The calcium sulfate is filtered, and the filtrate is added to about 400 ml. of methanol. About 10% of the triethylamine sulfate calculated as necessary to completely precipitate the streptomycin is added. The mixture is thoroughly agitated, filtered, and then the precipitate is washed with methanol and dried under diminished pressure. Triethylamine sulfate is added to the filtrate to completely precipitate the remaining streptomycin. This precipitate is filtered, washed with methanol, and dried in vacuo. The precipitates are found to have the following properties:

|   | 1st Precipitate | 2nd Precipitate |
|---|---|---|
| Weight_____grams__ | 0.87 | 11.4 |
| Potency (B. subtilis) _____γ/mg__ | 550 | 700 |
| LD₀_____γ__ | 300 | 1750 |

The term $LD_0$ denotes the maximum number of micrograms of streptomycin (in terms of free streptomycin base) that can be intravenously injected into a selected number of 20-gram mice and cause no deaths.

Example 7

To about 10.8 grams of streptomycin trihydrochloride assaying 410 γ/mg., dissolved in 35 ml. of water, is added about 4 ml. of a 20% aqueous sulfuric acid solution. It is then rapidly neutralized with diethylamine to about pH 5.5, and poured into 400 ml. of methanol. The precipitated streptomycin sulfate is filtered, washed with methanol, and dried in vacuo. The product weighs 9 grams and has a biological potency of 500 γ/mg.

Example 8

About 15 liters of clarified streptomycin broth assaying 243 γ/ml. is passed through a column containing about 20 grams of anion-exchange resin. The spent broth assays 20 γ/ml. The column is washed with water, then methanol, and the adsorbed streptomycin is eluted from the column by passing through 1.1 liters of methanol containing 30 ml. of concentrated hydrochloric acid. The eluate is adjusted to pH 5.5 with triethylamine, and then concentrated in vacuo to about ⅛ of its original volume. The precipitated salts are removed by filtration, one volume of methanol is added, and the streptomycin is precipitated as the methanol insoluble sulfate by the addition of triethylamine sulfate in methanol. The streptomycin sulfate is dried in vacuo (weight 8.5 grams) then dissolved in 55 ml. of a 75% water-25% methanol solution. The insoluble calcium sulfate is filtered, and the filtrate is poured into 400 ml. of methanol in order to reprecipitate the streptomycin sulfate. This product, when filtered, washed with methanol, and dried under diminished pressure, weighs 6.9 grams and has a biological potency of 385 γ/mg.

In addition to the streptomycin and polymyxin of the examples, other alkaline-reacting nitrogen-basic antibiotic substances or mixtures thereof can be employed in the practice of this invention, for instance, streptothricin, bacitracin, and the like.

The solvent in which the metathetic reaction between the streptomycin salt and the amine salt is carried out is a lower aliphatic alcohol or a mixture of lower aliphatic alcohols, preferably lower aliphatic monohydric alcohols of one to four carbon atoms. Of these, however, methanol is the preferred solvent. Satisfactory results are also obtained with mixtures of these alcohols containing other miscible solvents. Alcohols and mixtures of alcohols which have been found useful include: methanol, ethanol, propanol, butanol and ethylene glycol monoethyl ether, and mixtures of these with water, acetone and the like. In using methanol-water mixtures, streptomycin trihydrochloride can be dissolved in a small amount of water, triethylamine sulfate added, and the mixture poured into methanol. The final methanol concentration should preferably be above 90% for highest yields, although methanol-water mixtures in which the methanol to water ratio is lower can be used.

Salts of the streptomycin or other antibiotic which may be employed herein include those soluble in methanol and other lower aliphatic alcohols, such as the hydrochlorides, formates, acetates, nitrates, etc.

The pH of the reaction mixture may be varied considerably. For example, streptomycin sulfate is precipitated from a methanol solution of streptomycin trihydrochloride within the pH limits of pH 4.0–9.0. The preferred pH, however, is that of the normal salt, which for streptomycin is about pH 5.5. The solubility of streptomycin sulfate in the alcohol solvents increases as the pH decreases from pH 5.5. Below pH 4.0 the streptomycin sulfate fails to precipitate with triethylamine sulfate.

The principal requirement for the amine salts useful in this invention is that they are soluble in lower aliphatic, monohydric alcohols and react with the antibiotic salts. Among the amines whose salts can be employed are triethylamine, diethylamine, ethylamine, dimethylaniline, quinoline, pyridine and ethanolamine. The acid used to prepare the amine salts may be selected from a variety of organic or inorganic acids that produce insoluble salts with alkaline-reacting nitrogen-basic antibiotic substances. Among these acids are sulfuric, phosphoric, citric, oxalic, tartaric, succinic, adipic, glutaric, maleic, fumaric, mucic, etc. In fact, any acid whose nitrogen-basic antibiotic salt is insoluble in a lower aliphatic monohydric alcohol and whose amine salt is soluble in this type of solvent can be used. In addition to the amine salts illustrated by the examples, diethylamine phosphate, triethylamine mucate and the like can be used.

Although the preferred method for preparing the antibiotic salts is to add the amine salt to solutions of the antibiotic salt, alternatively, the acid, such as sulfuric may be added to the antibiotic solution, then the whole solution neutralized with an amine to the desired pH, or the amine may be added to the antibiotic solution, and the whole solution neutralized with the desired acid.

As many apparently widely different embodiments of this invention may be made without departing from the spirit and scope hereof, it is to be understood that this invention is not limited to the specific embodiments hereof, except as defined in the appended claims.

We claim:

1. In a process for the purification and recovery of an alkaline-reacting, nitrogen-basic, antibiotic elaboration product of a microorganism, the step of subjecting a crude solution of a salt of such antibiotic elaboration product in a lower aliphatic alcohol having from 1 to 4 carbon atoms to metathesis by adding to such solution a soluble amine salt selected from the group consisting of the sulfates, phosphates, citrates, oxalates, tartrates, succinates, adipates, glutarates, maleates, fumarates and mucates, whereby a corresponding salt of said elaboration product is selectively precipitated from the solution.

2. A process as claimed in claim 1, wherein the initial, alcohol-soluble antibiotic salt is a salt of streptomycin.

3. A process as claimed in claim 1, wherein the alcohol-soluble amine salt added is a triethylamine salt.

4. A process as claimed in claim 1, wherein the lower aliphatic alcohol employed is methanol.

5. In a process for the purification and recovery of an alkaline-reacting, nitrogen-basic, antibiotic elaboration product of a microorganism, the step of subjecting a crude methanolic solution of a salt of such antibiotic elaboration product to metathesis by adding to such solution a methanol soluble triethylamine salt selected from the group consisting of the sulfate, phosphate, citrate, oxalate, tartrate, succinate, adipate, glutarate, maleate, fumarate and mucate, whereby a corresponding salt of said elaboration product is selectively precipitated from the methanolic solution.

6. A process as claimed in claim 5, wherein the initial, methanol-soluble antibiotic salt is a salt of streptomycin.

7. In a method for purification and recovery of streptomycin, the step of subjecting a crude methanolic solution of a streptomycin hydrohalide to metathesis by adding to such solution triethylamine sulfate, whereby streptomycin sulfate is selectively precipitated.

8. A process as claimed in claim 1, wherein the initial, alcohol-soluble antibiotic salt is a salt of polymyxin.

9. A process as claimed in claim 1, wherein the initial, alcohol-soluble antibiotic salt is a salt of bacitracin.

10. A process as claimed in claim 1, wherein the initial, alcohol-soluble antibiotic salt is a salt of streptothricin.

11. A process as claimed in claim 1, wherein the initial, alcohol-soluble antibiotic salt is a salt of mannosido-streptomycin.

PETER P. REGNA.
ISAIAH A. SOLOMONS.

REFERENCES CITED

The following references are of record in the file of this patent:

UNITED STATES PATENTS

| Number | Name | Date |
|---|---|---|
| 2,462,175 | Folkers | Feb. 22, 1949 |
| 2,501,014 | Wintersteiner et al. | Mar. 21, 1950 |

OTHER REFERENCES

Fried et al.: Science, vol. 101 (June 15, 1945), pp. 613–615, 3 pages.

Carter et al.: J. Biol. Chem., vol. 160 (Sept. 1945), pp. 338–339, 2 pages.